United States Patent [19]
Bender et al.

[11] Patent Number: 5,893,067
[45] Date of Patent: Apr. 6, 1999

[54] METHOD AND APPARATUS FOR ECHO DATA HIDING IN AUDIO SIGNALS

[75] Inventors: Walter Bender, Auburndale; Daniel Gruhl, Cambridge, both of Mass.; Norishige Morimoto, Tokyo, Japan

[73] Assignee: Massachusetts Institute of Technology, Cambridge, Mass.

[21] Appl. No.: 656,378

[22] Filed: May 31, 1996

[51] Int. Cl.[6] ............................ G10L 3/02; H03G 3/00
[52] U.S. Cl. ............................ 704/502; 381/63
[58] Field of Search .................... 704/501, 500, 704/502, 229; 381/63, 62, 61

[56] References Cited

U.S. PATENT DOCUMENTS

| | | | |
|---|---|---|---|
| 5,185,800 | 2/1993 | Mahieux | 704/229 |
| 5,319,735 | 6/1994 | Preuss et al. | 704/205 |
| 5,369,710 | 11/1994 | Asai | 381/63 |
| 5,394,274 | 2/1995 | Kahn | 360/27 |
| 5,444,785 | 8/1995 | Izawa et al. | 381/63 |
| 5,636,292 | 6/1997 | Rhoads | 383/232 |

FOREIGN PATENT DOCUMENTS

| | | | |
|---|---|---|---|
| 0 289 080 | 11/1988 | European Pat. Off. | 1/66 |
| 0 372 601 | 6/1990 | European Pat. Off. | 1/66 |

OTHER PUBLICATIONS

Gruhl, D. et al, "Echo Hiding", *Information Hiding* (1996).
Bender, W. et al, "Techniques for data hiding", *IBM Systems Journal*, vol. 35, No. 3–4, pp. 313–336 (1996).
Bender, W. et al, "Techniques for data hiding", *SPIE*, vol. 2420, pp. 164–173 (1995).

*Primary Examiner*—David R. Hudspeth
*Assistant Examiner*—Patrick N. Edouard
*Attorney, Agent, or Firm*—Cesari and McKenna, LLP

[57] ABSTRACT

A method of hiding information in a host audio signal introduces one or more echoes into the signal. The separation in time between the host signal and an echo is associated with the value of a datum embedded in the signal. The identity of the embedded datum is determined by observing the delay between the host signal and the echo.

61 Claims, 8 Drawing Sheets

METHOD AND APPARATUS FOR ECHO DATA HIDING IN AUDIO SIGNALS

FIELD OF THE INVENTION

This invention relates to steganography. More particularly, this invention relates to techniques for embedding data in audio signals.

BACKGROUND OF THE INVENTION

Reliable and economical methods for incorporating and detecting signature information in audio signals are attractive for many applications. Such a signature could be used, for example, to embed copyright data in music or other types of audio signals. The presence of the signature in a suspect signal would make unauthorized use of that signal easy to demonstrate. Or, the signature information could indicate the serial number of an audio signal intended for broadcast, allowing the number of times the signal is broadcast to be reckoned automatically. Another possible application is in assurance of content integrity. The signature may be a string of identification tags placed throughout a host signal. Periodic checking of the encoded signal for modified or missing tags would reveal whether the signal has been modified or clipped since encoding. In other applications, the signature could include augmentation data, such as caller identification in telephone transmissions; product identification in radio broadcasts, for example, song name, performer, recording; or closed-captioning of television signals.

Known approaches to incorporating such information have emphasized introducing the data in a form that is not perceivable by the human auditory system ("HAS"). Hiding data imperceptibly in audio signals is especially challenging for several reasons. The HAS operates over a wide dynamic range and can detect signals of strengths falling in a range greater than one billion to one. The HAS can also perceive frequencies over a range wider than one thousand to one. Its sensitivity to additive random noise is also acute. Perturbations as small as one part in ten million (80 dB below ambient level) in an audio string can be detected by the HAS.

Data hiding is a class of processes used to embed recoverable (e.g., signature) data in digitally represented information, such as a host signal, with minimal perceivable degradation to the host information. In this approach, the changes introduced by embedded data may be perceivable by a human listener, as long as they are not conspicuous or objectionable. The goal of data hiding is not to restrict access to the host information, but rather to distribute embedded data along with the host information. The ability to embed data inconspicuously makes data hiding attractive for adding signature information to audio signals.

It is to be anticipated that after incorporating the signature information, the encoded signal will undergo degradation by intentional manipulation and inadvertent modification due, for example, to channel noise, filtering, resampling, editing, clipping, lossy compression, or digital-to-analog/analog-to-digital conversion. In order to be effective, the data hiding technique should embed the signature information in a manner that allows determination of its presence or absence even after such signal modifications. This requirement limits the utility of introducing embedded data in a manner that is not perceived by the HAS at all, for example, as noise, since lossy data compression algorithms tend to remove such imperceptible or nonessential elements from the signal.

Other requirements of the signature embedding technique depend on the nature and intended use of the embedded information. For example, if the signature contains copyright information, it is especially important that the technique be resistant to attempts by an unauthorized user to obscure or eliminate the embedded data.

DESCRIPTION OF THE INVENTION

Summary of the Invention

Echo data hiding embeds a data value in an analog or digital host audio signal by introducing one or more echoes, or resonances, offset in time from the host audio signal by an offset value associated with the data value of the bit. The alteration to the host signal can be characterized in terms of several parameters: the number of echoes introduced; the offset value separating the first echo from the host signal and echoes from one another; and the amplitudes of the echoes. For sufficiently small values of these parameters, the HAS interprets an added resonance as a natural resonance due to, for example, interaction of the signal with the walls of a room. Echo hiding introduces resonances to the host signal which are on the order of human vocal tract resonances and are thus generally perceived as natural and considered enhancements rather than noise; thus the embedded data is resistant to removal by many of the known lossy data compression algorithms, since such perceptual encoding algorithms are designed to preserve such resonances. Although any number of data values may be defined, generally, a set of only two different offset values are designated-one defining a one echo, associated with binary one, and the other defining a zero echo, associated with binary zero—to allow encoding of binary bit strings. As used herein, the term "audio signal" encompasses audible manifestations as well as electronic or mathematical representations of a signal.

To decode the embedded information, the test signal is checked at one or more predetermined offset values for a resonance of the host signal. The presence or absence of the resonance indicates the presence or absence of the associated data value. Any of several pattern recognition techniques known in the art may be used for decoding. One such way of detecting echoes is by examining the magnitude of the autocorrelation of the cepstrum of the encoded signal at times corresponding to the designated offsets. In decoding binary bit strings, a binary one is assigned to the signal if the magnitude of the autocorrelation function is greater at the time equal to the offset value denoting one than at the time denoting zero. If the opposite case holds, a binary zero is assigned.

This string-embedding operation is equivalent to partitioning the host signal into shorter segments corresponding to positions in the string, adding to each of the segments an echo representing the desired bit for the corresponding position in the string, and then reconcatenating the altered segments. This approach may be extended to allow embedding two or more bit strings simultaneously by defining more than one pair of offset values and adding, at each position in the string, one of the echoes defined by each pair.

In one technique for embedding an ordered string of binary bits in a signal, two encoded versions of the host signal are created: one containing the one-offset echo and the other containing the zero-offset echo. Segments from each of the encoded versions are arranged to construct an encoded string signal comprising the host signal and echoes having different offset values, according to the desired sequence of bits, of sections of the host signal. Construction of the encoded string signal is preferably accomplished using mixer filters. Each encoded signal containing an echo is processed by a mixer filter associated with the bit-string and with the binary value associated with the echo in that encoded signal. Each mixer filter has domains corresponding to positions in the bit string. The value of the mixer filter over a domain is equal to either one or zero according to whether or not its associated binary value is present at the corresponding position in the string. After processing by the mixer filters, the two encoded signals are added together. Ramped transitions between the two values in the mixer prevent abrupt, noticeable changes in the resonance of the final recombined signal.

The invention can be used to place a signature redundantly throughout an audio data stream. As a result, a reasonable level of hidden information is maintained intact even after operations such as extracting or editing. Such an approach is useful for the placement of copyright information. With redundantly placed copyright information, unauthorized use of protected music becomes easy to demonstrate. Any clipped portion of an encoded host signal will contain the signature containing the copyright information. Improper use of sound bites so encoded and then distributed over, for example, the Internet can be detected by a "web crawler" or similar facility periodically dispatched to decode sound bytes. For such applications, detection and modification of the hidden data is for the benefit of the encoder rather than of the end user, and encoding parameters are chosen to ensure a very low probability that the encoded data will be perceived, and then possibly removed, by the end user.

The method of the invention can provide assurance of content integrity by embedding a known string of identification tags throughout the host signal. The test signal can be checked for modified or missing tags, thereby establishing whether the signal is authentic and complete. A specific example of such an application is verification of contract compliance by broadcasters who have agreed to transmit a given commercial or other audio clip a certain number of times per hour. The purchaser of the air time can embed a string of identification tags in the clip before giving it to the broadcaster. The number of times the clip is aired can be easily reckoned by a computer configured to monitor the transmissions of the broadcaster, such as a radio station, and detect each airing of the string or of portions thereof.

The invention can also be used to unobjectionably hide information placed in the signal expressly for consumption by the user. Augmentation data, such as closedcaptioning of audiovisual media, such as video or motion picture, and caller identification, is one class of such user-beneficial data encodable by the invention. The invention is especially advantageous for types of augmentation data that normally require additional channels for transmission and/or storage, because the invention places data directly into the host signal. Thus the number of channels required to transmit the data can be reduced. For example, using echo data hiding, the audio portion of a television signal could be altered to contain both the original host audio portion of the television signal and the closed-captioning information. In another application, the invention can be used to insert caller identification information directly into the voice signal, independently of the telephone being used to place the call. Thus, in addition to the identity and location of the phone line conventionally provided by caller-identification systems, the invention could be used to encode the identity of the caller and other information related to, for example, the caller's business activity, in the voice signal. Thus, echo data hiding can expand caller identification to include voice identification and authentication. In large conference calls when several people talk simultaneously, this capability facilitates attribution of remarks to specific participants. Any telephone call which requires a high degree of assurance of the identify of parties can benefit from echo data hiding.

BRIEF DESCRIPTION OF THE DRAWINGS

The foregoing discussion will be understood more readily from the following detailed description of the invention, when taken in conjunction with the accompanying drawings, in which:

FIGS. 7A–7C graphically depict encoding a bit in a host audio signal, FIG. 7A depicting a discrete-time exponential host audio signal.

FIGS. 8A–8C graphically depict cepstral features, FIG. 8A illustrating the cepstrum of a system function, FIG. 8B illustrating the cepstrum of a discrete-time exponential host audio signal.

It will be appreciated that, for purposes of illustration, these figures are not necessarily drawn to scale.

DETAILED DESCRIPTION OF THE INVENTION

Figure 1:
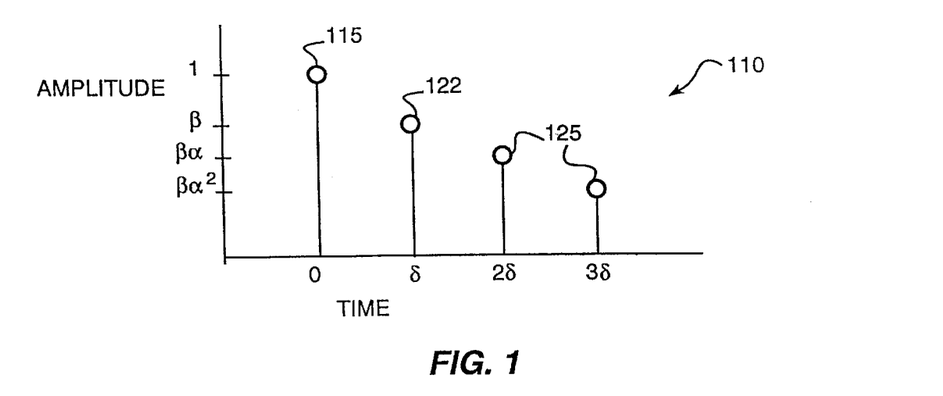
FIG. 1 graphically depicts a system function for embedding a resonance in a host signal.

The encoded signal containing the embedded information is conveniently produced from a host signal by processing with a system function, such as the pulse train shown in FIG. 1. The pulse train, generally designated at 110, comprises a series of N pulses separated in time by an offset value δ. A first pulse 115 copies the host signal into the encoded signal. The other pulses, designated echo pulses, introduce repetitions or echoes of the host signal. For a first pulse 115 normalized to unit amplitude, the first echo pulse 122 has amplitude β, designated the echo amplitude of the pulse train 110. The amplitudes of the other echo pulses 125 are generally described in terms of a characteristic decay rate $\alpha_i$, defined such that the amplitude of a pulse i at $t=i\delta$ is equal to the magnitude of the pulse i−1 at $t=(i-1)\delta$ multiplied by $\alpha_i$. The values of $\alpha$, $\beta$, $\delta$ and N are chosen to optimize the recovery of the data and minimize the detectability of the signal alteration by the consumer of the altered host audio signal. Although the decay rate $\alpha_i$ is in general a function of i, it is usually chosen to have a constant value $\alpha$. If the decay rate $\alpha$ equals the echo amplitude $\beta$, the pulse train is a discrete-time exponential. The system function need not comprise impulse functions as in the illustrated pulse train 110. For example, the system function may include one or a series of Gaussian-shaped pulses. In general, the system function may have any form that introduces a resonance, especially one perceived as a typical natural resonance, into the host signal. Also, the system function may include pulses that introduce echoes appearing earlier in time in the encoded signal than the host signal.

A set of system functions is defined including one function for each data value to be included in the encoded information. Usually, one system function is associated with a binary zero and another system function with a binary one. The parameters describing each of the various system functions in the set may be chosen independently. The same values of $\alpha$, $\beta$ and N may be used in the system functions associated with different bit values. However, the offset values of the system functions in a set must be sufficiently different to be distinguishable from one another at decoding in order to allow efficient recovery of the embedded data.

Figure 2:
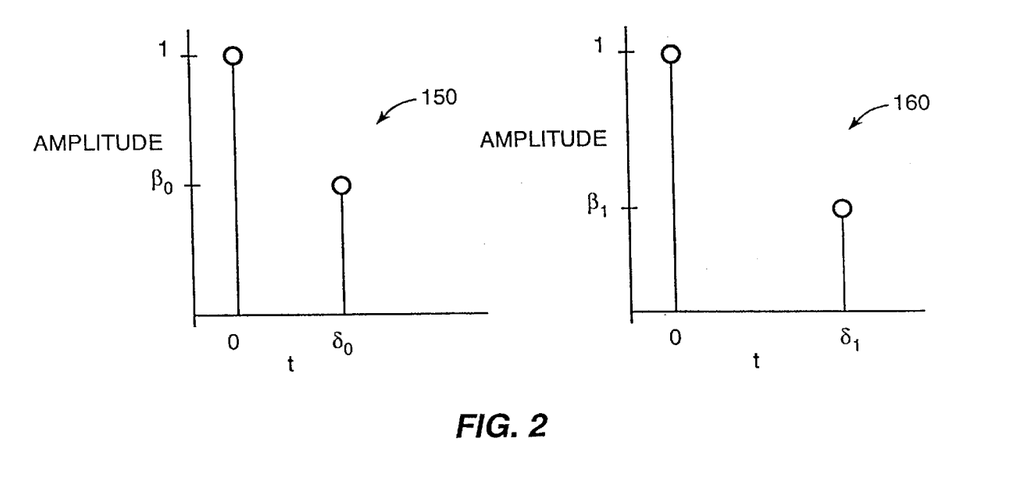
FIG. 2 graphically depicts a zero function and a one function, which are special cases of the system function shown in FIG. 1.
Figure 3:
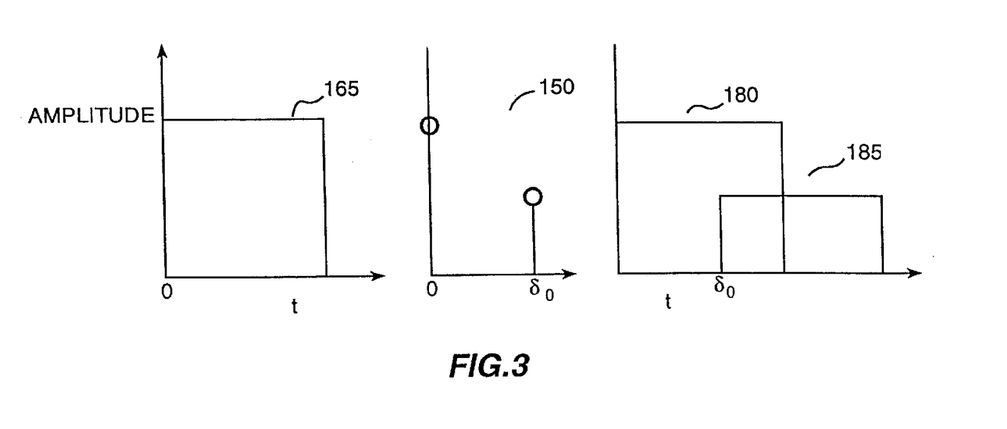
FIG. 3 graphically depicts processing a host signal with a system function.

An illustrative set of system functions for encoding binary data is shown in FIG. 2. The system function associated with the binary zero, designated the zero function 150, has an echo amplitude $\beta_0$ and an offset value $\delta_0$. The system function associated with the binary one, designated the one function 160, has an echo amplitude $\beta_1$ and an offset value $\delta_1$ not equal to $\delta_0$. As is illustrated schematically in FIG. 3, processing a host audio signal 165 with such a system function, such as the pulse train 150, results in an encoded signal 175 comprising a copy 180 of the host signal and a first repetition 185 offset from the host signal by an offset value associated with a bit value, in this case the offset value $\delta_0$ associated with a bit value of zero.

Figure 4:
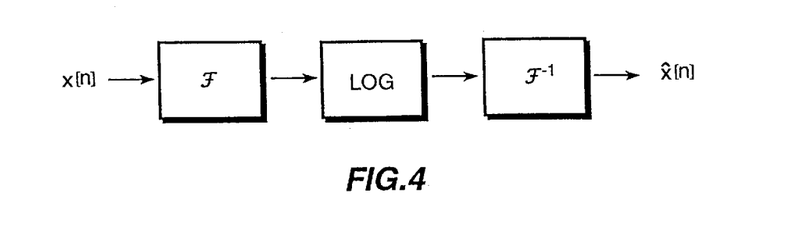
FIG. 4 is a flow chart illustrating computation of a cepstrum.

Decoding the encoded signal to recover a bit embedded by the techniques of the invention involves examining a test signal to detect host signal repetitions separated in time by the offset value. To determine whether a one or zero has been encoded, the strength of repetitions at offset values at $\delta_1$ and $\delta_0$ are compared. This detection may be done by any of the pattern recognition techniques well known in the art, such as auto correlation. However, an especially convenient approach incorporates cepstral analysis. (See, e.g., Oppenheim et al., *Discrete-Time Signal Processing*, Prentice Hall [1989].) The cepstrum $\hat{x}[n]$ is the inverse Fourier transform of the logarithm of the signal's power spectrum, which is itself the square of the Fourier transform of the signal $x[n]$, as indicated in FIG. 4. The cepstrum of a signal containing an echo has an additive periodic component and thus exhibits a peak at the echo offset.

Autocorrelation of the cepstrum will result in a power spike at the offset value, facilitating recognition of the peak. In general, autocorrelation of a function of n points requires $n^2$ operations. The similarity between autocorrelation and convolution, and the properties of the cepstrum, can be exploited to allow autocorrelation of the cepstrum to be accomplished in only n·log n operations. In addition to this efficiency advantage, the computational accuracy of this approach, described below, facilitates proper differentiation of the relative power values at different offset values. The autocorrelation $R_{xx}[n]$ of a function $x[n]$ is defined to be $$R_{xx}[n] = \sum_{m=-\infty}^{+\infty} \bar{x}[n+m]x[m].$$

With a change of variable (letting k=n+m and substituting m=k−n), $R_{xx}$ can be expressed as $$R_{xx} = \Sigma x[k]\bar{x}[-(n-k)]. \tag{1}$$

The convolution of two functions $x[n]$ and $h[n]$ is $$x[n]*h[n] = \sum_{n=-\infty}^{+\infty} x[k]h[n-k]. \tag{2}$$

Thus, for the purposes of the invention, the autocorrelation of a function $x[n]$ as expressed in equation 1 is equivalent to the convolution $x[n]*x[n]$ defined in equation 2.

Figure 5:
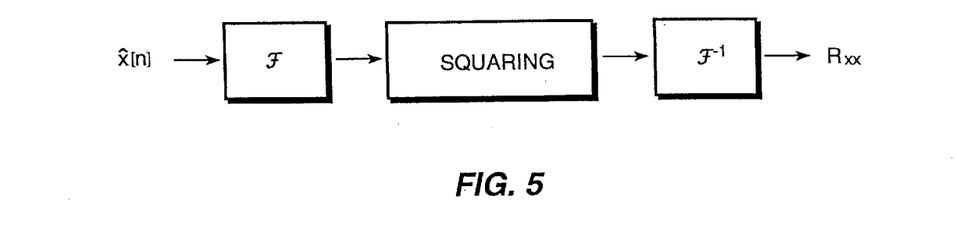
FIG. 5 is a flow chart illustrating computation of the autocorrelation of a cepstrum.
Figure 6:
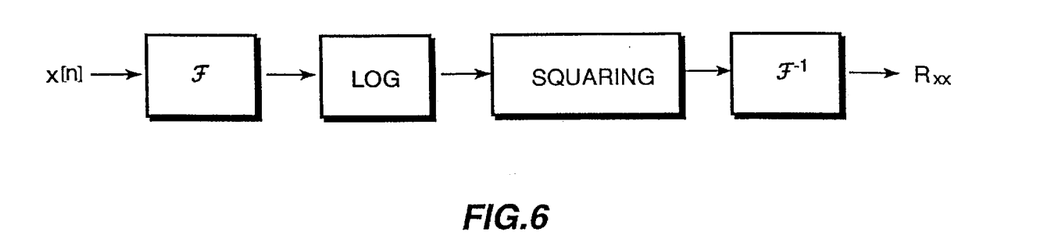
FIG. 6 is a flow chart illustrating an efficient and accurate method for computing the auto correlation of a cepstrum.

The cepstrum of the convolution of two functions is equal to the sum of the cepstra of the functions. Therefore, computing the convolution $x[n]*x[n]$, or similarly the autocorrelation $R_{xx}$, is equivalent to doubling the cepstrum $\hat{x}[n]$ and then performing the inverse of the operation sequence shown in FIG. 4 on $2\cdot\hat{x}[n]$. The same result can be achieved more conveniently by squaring the Fourier transform of the cepstrum $\hat{x}[n]$ and then taking the inverse Fourier transform according to the sequence indicated in FIG. 5. If the operations shown in FIG. 4 and FIG. 5 are performed consecutively, the inverse transform of FIG. 4 and the forward transform of FIG. 5 cancel one another, so that a more efficient approach, beginning with the signal $x[n]$ is to modify the cepstrum computation of FIG. 4 by inserting a squaring operation after the logarithm, according to the sequence indicated in FIG. 6.

Figure 7A:
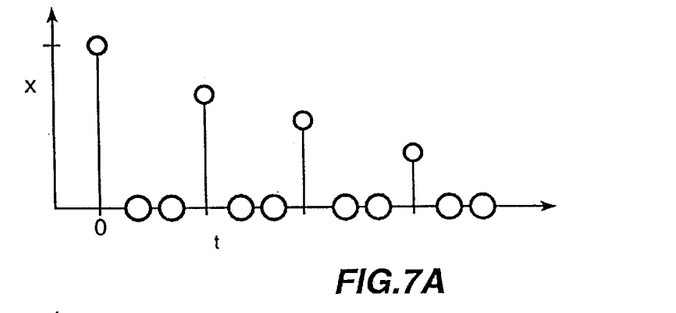
Figure 7B:
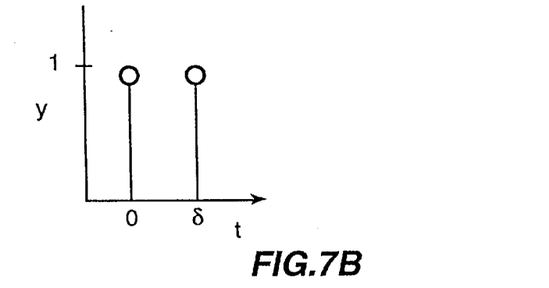
FIG. 7B depicting a system function, and FIG. 7C depicting the convolution of the host audio signal and the system function.
Figure 7C:
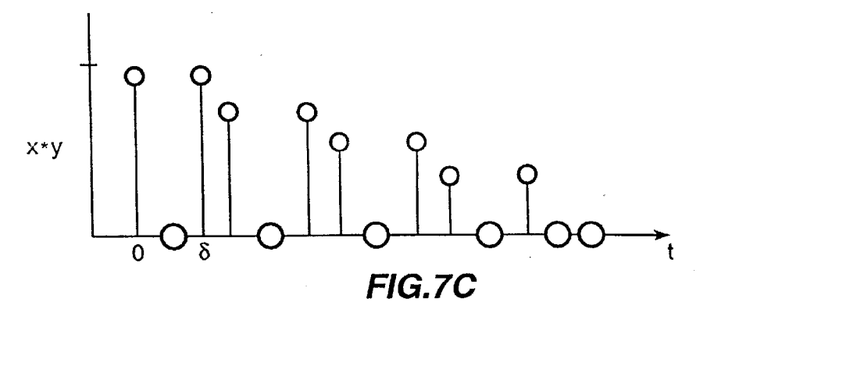
Figure 8A:
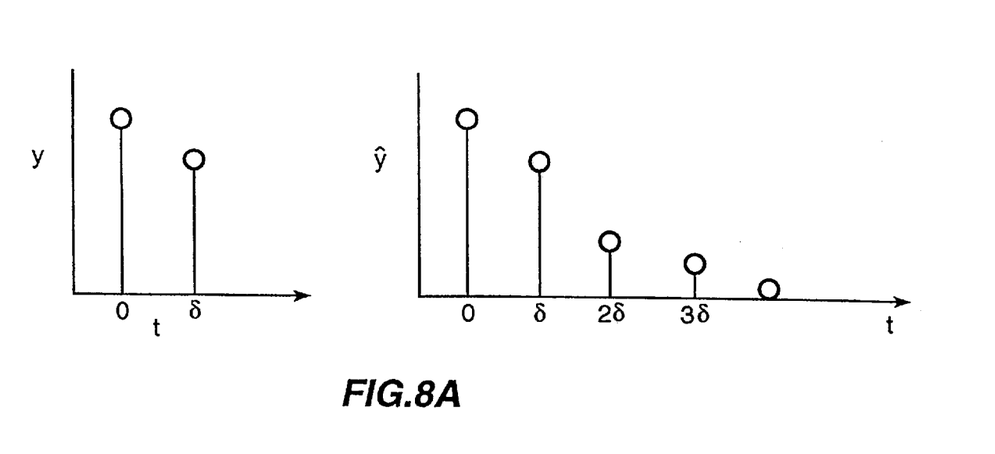
Figure 8B:
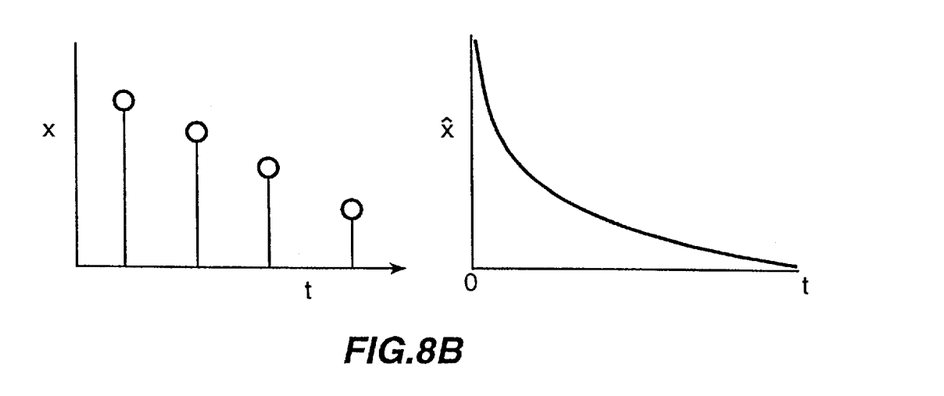
Figure 8C:
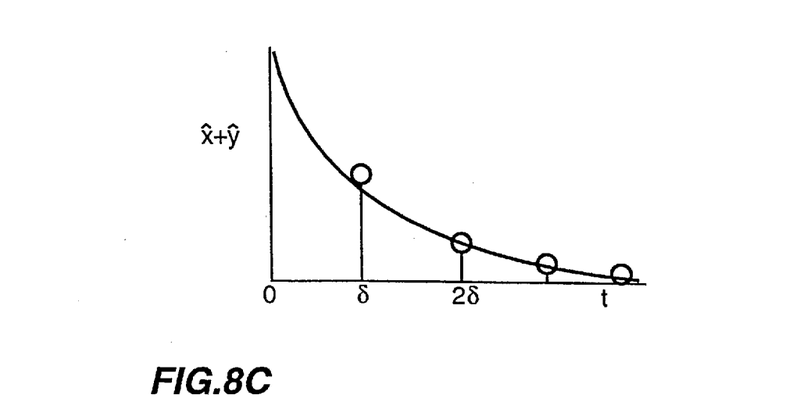
FIG. 8C illustrating the cepstrum of the convolution of the host audio signal and the system function.
Figure 9:
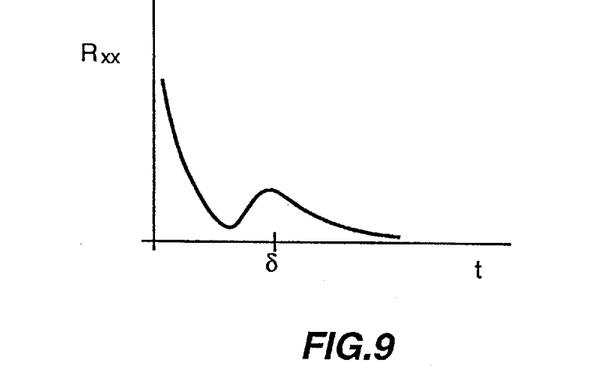
FIG. 9 graphically depicts the autocorrelation of the cepstrum of FIG. 8C.

Consider a host signal comprising a series of impulses, separated in time by a constant interval and having exponentially decaying amplitudes, such as the function x shown in FIG. 7A. Introducing an echo having offset 6, associated with some bit value, into the host signal by convolution with the system function y shown in FIG. 7B results in the encoded signal shown in FIG. 7C. If the encoded signal is then provided as a test signal for decoding, taking the cepstrum of the test signal, which is the sum of $\hat{y}$ and $\hat{x}$, as is demonstrated in FIGS. 8A–8C, will clarify the spacing 8 between the host signal and the echo. Although the cepstrum $\hat{x}+\hat{y}$ contains a series of repeated impulses spaced $\delta$ apart, the magnitudes of the repeated impulses are not sufficiently large compared to $\hat{x}$ to be easily detectable. The autocorrelation of the cepstrum of the test signal, FIG. 9, shows a spike at the position of the first impulse of the cepstrum of the signal shown in FIG. 8C. The autocorrelation is evaluated at each of the offset values designated for encoding. The offset value at which the largest autocorrelation amplitude is located indicates the value of the embedded datum.

Figure 10A:
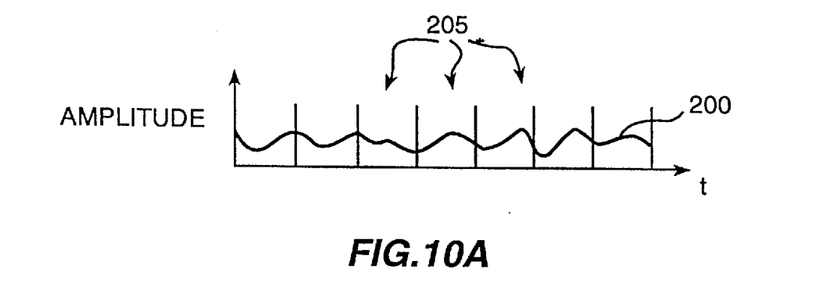
FIGS. 10A–10C graphically depict a host signal and echoes thereof.

In order to encode a string of several bits, a single bit is encoded into each of several temporal segments of a signal. Conceptually, a signal such as the host audio signal 200 shown in FIG. 10A is divided into segments 205, each of which is then processed as an independent host audio signal to introduce an echo embedding the bit desired value for the corresponding position in the string, thus creating an encoded string. Finally, the processed segments are combined to constitute an encoded string signal.

Figure 10B:
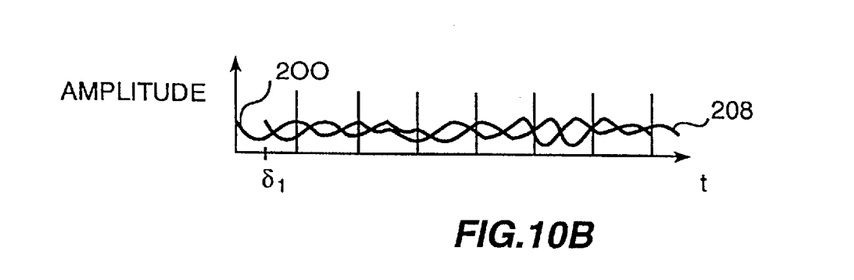
Figure 10C:
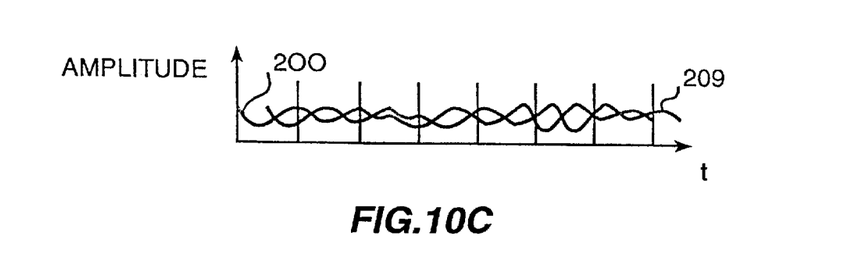

In practice, creation of the encoded string signal is more conveniently implemented by processing the entire host audio signal 200 to create one encoded signal for each of the bit values to be included in the string. FIG. 10B shows the host audio signal 200 with a one echo 208 embedded in one of the encoded signals by processing with a one function; FIG. 10C shows the host audio signal 200 with a zero echo 209 embedded in the other of the encoded signals by processing with a zero function. The encoded string signal containing the desired sequence of bits is created by arranging segments of the encoded signals to constitute a signal containing the host signal and repetitions, having different offset values, of sections of the host audio signal, arranged in the appropriate order.

Figure 11:
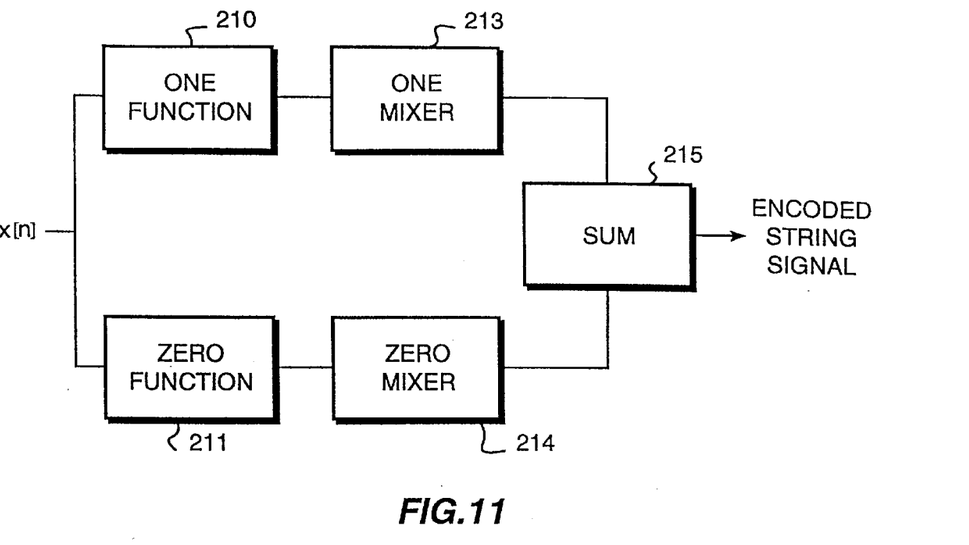
FIG. 11 schematically illustrates encoding a bit string in a host audio signal.
Figure 12A:
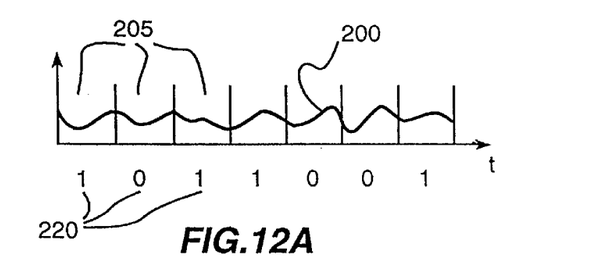
FIGS. 12A–12C schematically illustrates mixer filters for encoding a bit string.
Figure 12B:
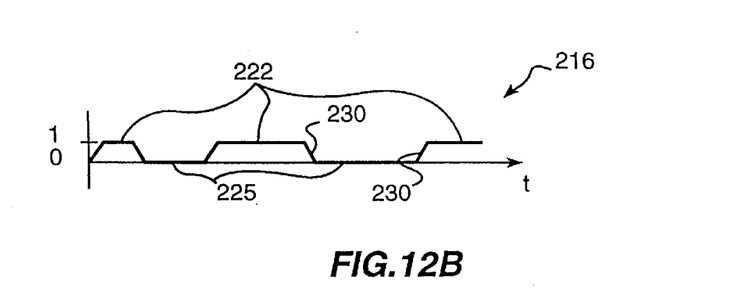
Figure 12C:
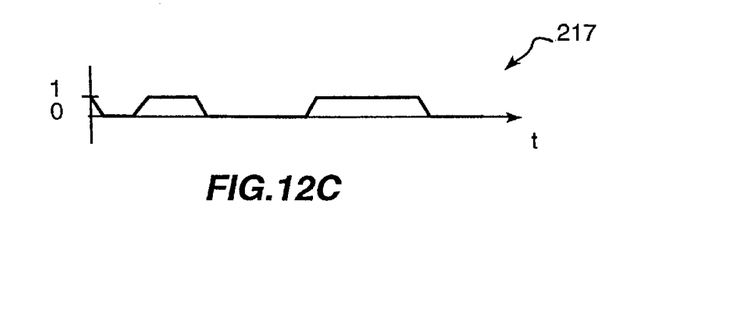

Mixer filters may be used to create the encoded string signal from the encoded signals. FIG. 11 shows the process beginning with the host audio signal x[n], which is processed by both the one function, at 210, and the zero function, at 211, to create encoded signals. Each encoded signal is filtered by the one mixer filter, at 213, or the zero mixer filter, at 214, and the results are summed at 215 to form the encoded string signal. FIGS. 12B and 12C show a one mixer filter 216 and a zero mixer filter 218 for filtering the encoded signals created by processing the host audio signal 200 with the one function and the zero function, respectively, to create an encoded string signal containing the series of bit values 220 in the corresponding segments 205, shown in FIG. 12A. Each mixer filter scales its respective encoded signal either by one, designating that the bit contained in that encoded signal is to be embedded in the encoded string signal, or by zero, designating that that bit is not to be embedded. For example, the one mixer filter 216, for filtering the encoded signal created using the one-function, has a value of one over regions 222 corresponding to sections of that encoded signal to be incorporated in the encoded string signal, or equivalently to sections of the encoded string signal to be encoded with a bit having value one. The one mixer filter 216 has a value of zero over regions 225 corresponding to sections of the encoded string signal to be encoded with a bit having value zero. In intermediate ramped regions 230, the mixer filter has transitional values. The sum of the zero mixer filter and the one mixer filter is a constant power.

After processing each encoded signal with the appropriate mixer filter, the resulting signals are added together to create the encoded string signal. The design of the mixer filters results in a smooth transition between sections of the encoded string signal embedded with different bits and prevents abrupt, noticeable changes in its resonance.

Decoding such an embedded string requires reproduction in the test signal of the segmentation used in the host audio signal. Then each segment of the test signal is examined to determine whether an offset value of $\delta_1$ or of $\delta_0$ is detectable, thus confirming the presence of a bit having value equal to one or to zero at the corresponding location in the embedded bit string.

If the encoded string signal is clipped in a manner that removes a portion not corresponding to an integral number of segments, not only will the bits in the clipped material be lost, but the time origin for the segmentation of the test signal will not be identified accurately. Since the decoding segments based on the inaccurate origin may straddle portions of roughly equal length from two adjacent encoding segments, encoded with different bits, this loss may seriously degrade recovery of the unclipped data. Nyquist sampling theory may be used for verification that the origin for the test signal segmentation has been accurately identified. A bit string designated the error correction code is preferably embedded in a portion of the host signal. During decoding, detection of the error correction code confirms correct selection of the segmentation origin. Preferably, the decoding procedure employs a decoding segment length equal to less than half the segment length used in constructing the encoded string signal. Two sets of decoding segments are defined—one including the odd-numbered decoding segments and the other including the even-numbered decoding segments. A bit string for each of the sets is reconstructed by observing the echo delays in the segments of that set. The segments from at least one of these sets of decoding segments should fall completely within the domains of individual encoding segments and will manifest the error correction code upon decoding. The bit string containing the error correction code is considered to contain the encoded data, apparently being based on a reliable segmentation origin.

A related approach employs a decoding segment length equal to an odd fraction $$\frac{1}{2n-1}$$

for $n \geq 2$—of the encoding signal length, with each set of $2n-1$ decoding segments corresponding to a position in the bit string. After decoding, each set of $2n-1$ decoding segments is assigned the bit value associated with the offset value determined to be most prominent in the majority of those $2n-1$ segments.

Using the methods described, information has been encoded and decoded in the form of binary digits into a digital audio stream, with minimal degradation to the host signal, at a data rate of 2 to 64 bits per second ("bps"), depending on the sampling rate and the type of sound being encoded. Sixteen bps is a typical value. For a typical sound sample encoded at a typical level, the average human cannot hear any objectionable distortion in the encoded signal; the added resonance simply gives the signal a slightly richer sound.

In order to maintain a high-quality digital audio signal and to minimize degradation due to quantization of the original signal, the signals used in these examples were represented using the 16-bit linear quantization Audio Interchange File Format (AIFF). Sixteen-bit linear quantization introduces the least amount of signal distortion, and AIFF contains information more efficiently than any other sound file formats. Various temporal sampling rates were used, including 8 kHz, 10 kHz, 16 kHz, 22.05 kHz, and 44.1 kHz. Acceptable embedded data recovery rates were achieved at all of these sampling rates.

For discrete time exponential system functions used to encode bit strings in sound clips covering a wide range of sound types, the decay rate $\alpha$, in this case equal to the echo amplitude $\beta$, has been found to be the most important parameter for predicting the data recovery rate. For host signal types including music, speech, a combination of music and speech, and sporadic music or speech separated by empty space or noise, at least 85% of the bits embedded in a signal have been found to be recoverable for decay rates between 0.3 and 0.85. For encoded signals undergoing lossy compression, values of 0.4 to 0.8 are preferable. In general, although not always, recovery rate increases with increasing value of decay rate. However, echoes having lower values of $\alpha$, particularly those below 0.6, are much more difficult to detect by the HAS.

The values used for offset $\delta$, the echo amplitude $\beta$, and the number of repetitions N are less critical to recovery rate. However, these parameters play a significant role in the perceivability of the synthetic resonances. Smaller values of offset enhance blending of the echoes with the host signal, so that it is difficult for the HAS to resolve the echo and the host signal as two distinct signals. The average listener cannot resolve an echo with an offset of 1 millisecond. Data embedded using echoes with offset values greater than 0.5 milliseconds generally are recoverable at acceptable rates.

Although the signals described above in the examples used digital technology, echo data hiding is also applicable to analog signals. For example, an analog host signal may encoded simply by transmitting the host signal simultaneously along two paths, one longer than the other, thereby introducing a relative offset between the two transmissions. Recombination forms an encoded signal comprising the host signal and its echo.

Figure 13:
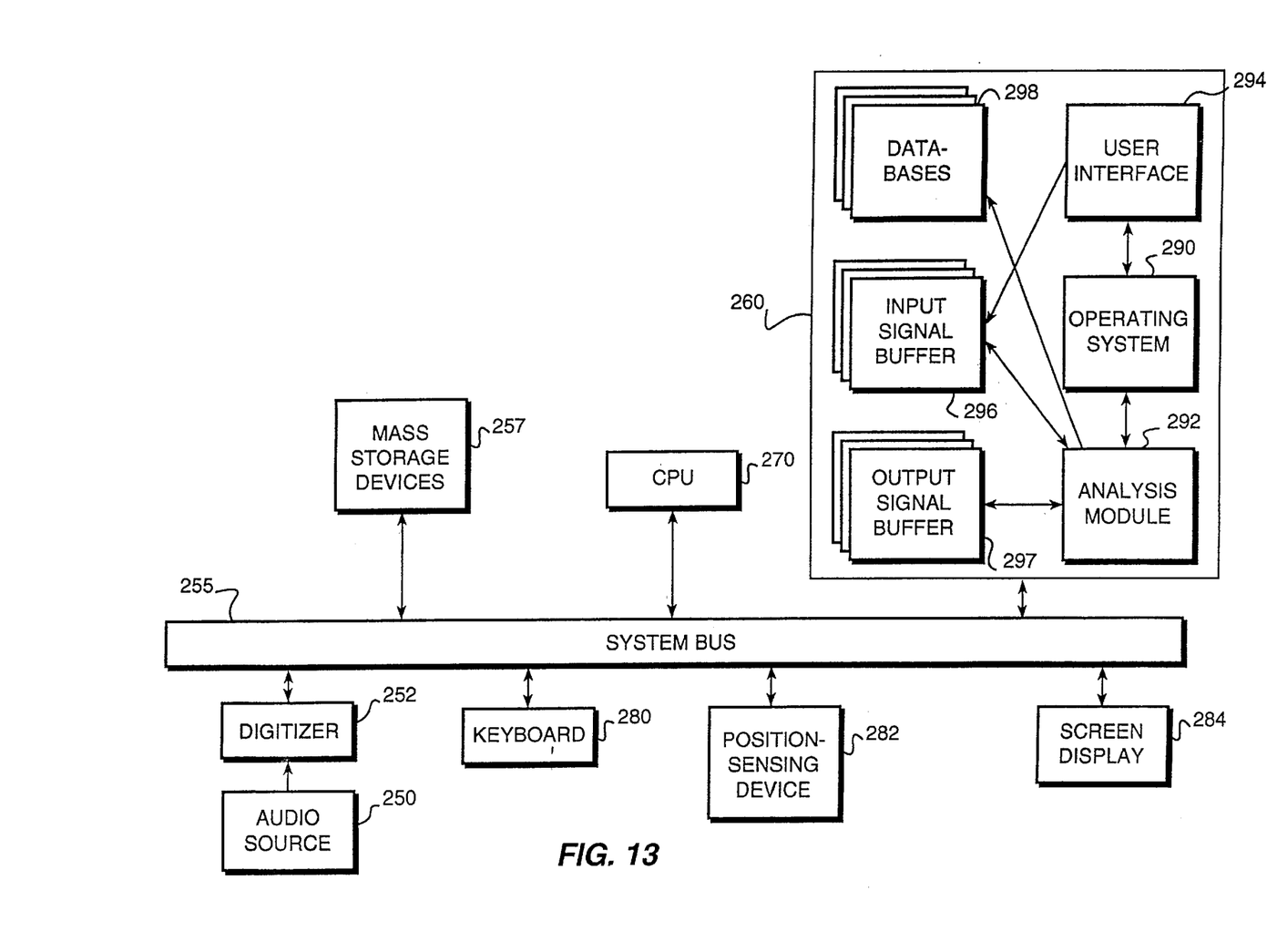
FIG. 13 shows a representative hardware environment for the present invention.

Refer now to FIG. 13, which illustrates, in block-diagram form, a hardware system incorporating the invention. As indicated therein, the system includes a digitizer 252 for digitizing audio signals supplied by an audio source 250. The digitized audio signal is sent as a bitstream on a system bus 255, over which all system components communicate, and may be stored in a mass storage device (such as a hard disk or optical storage unit) 257 as well as in a main system memory 260 (specifically, within a partition defining a series of input signal buffers 262).

The operation of the illustrated system is directed by a central-processing unit ("CPU") 270. The user interacts with the system using a keyboard 280 and a position sensing device (e.g., a mouse) 282. The output of either device can be used to designate information or select particular areas of a screen display 284 to direct functions to be performed by the system.

The main memory 260 contains a group of modules that control the operation of CPU 270 and its interaction with the other hardware components. An operating system 290 directs the execution of low-level, basic system functions such as memory allocation, file management and operation of mass storage devices 257. At a higher level, an analysis module 292, implemented as a series of stored instructions, directs execution of the primary functions performed by the invention, as discussed below. Instructions defining a user interface 294 allow straightforward interaction over screen display 284. User interface 294 generates words or graphical images on display 284 to prompt action by the user, and accepts user commands from keyboard 280 and/or position-sensing device.

The main memory 260 also includes one or more input signal buffers 296 that contain signals, such as a host or test signal, used as input for processing according to the invention and output signal buffers 297 that contain an encoded signal generated by that processing. The contents of each input or output signal buffer may be used to drive screen display 284 to graphically display that signal.

One or more databases 298 contain encoding and/or decoding information, e.g., the offset value, echo amplitude, number of pulses, and decay rate associated with each bit value, other details of the system functions, the segment length and the segmentation origin, the error correction code. One or more of the databases 298 may be associated with each one of the signal buffers 296 or 297 and contain information specific to the signal contained in the associated buffer; or, one database 298 may contain information generic to all signals encoded or decoded by the apparatus. The databases may be stored in the mass storage device 257 in file(s) linked to file(s) containing the associated signal(s).

It must be understood that although the modules of main memory 260 have been described separately, this is for clarity of presentation only; so long as the system performs all necessary functions, it is immaterial how they are distributed within the system and its programming architecture.

Also, the host signal may be provided by the user in functional or numeric form rather than by the audio source 250. Storage of the host or test signal is not an absolute requirement; the signal may be processed in real time.

As noted above, execution of the key tasks associated with the present invention is directed by analysis module 292, which governs the operation of CPU 270 and controls its interaction with main memory 260 in performing the steps necessary to encode one or more bits in a host signal or to detect the presence or absence of a bit or bit stream in a test image.

Figure 14:
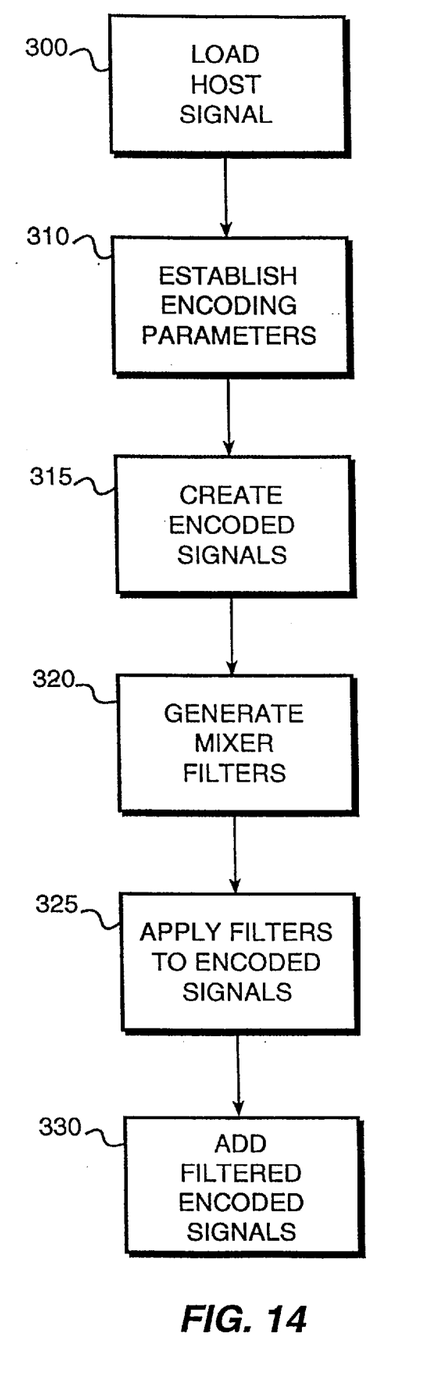
FIG. 14 is a flow chart illustrating encoding according to the invention.

In particular, the procedure followed by the hardware system for encoding a binary bit stream in a host signal is shown in FIG. 14. In a first step 300, the host signal is loaded into a first one of input signal buffers 296, so that it is available to analysis module 292. Then the module 292 establishes the encoding parameters in step 310. These parameters include the bit stream to be encoded; the offset values associated with the one-function and the zero-function; and other details of the system functions including the number, amplitudes, shapes, and arrangement of their features, such as pulses. In response to a user command, the module 292 either retrieves these parameters, from the user interface 194 or the appropriate database 298, or determines the appropriate parameters for encoding the host signal based on the considerations outlined previously herein. This step also includes designating a series of temporal points in the host signal defining segments. The values determined for the parameters may be retained in one of the databases 298.

In step 315, the analysis module 292 applies each system function to the host signal to create one encoded signal for every bit value to be included in the bit stream. In step 320, the module 292 generates a mixer filters for each of the bit values to be included in the bit stream. In step 325, the module 292 applies each of the generated mixer filters to the encoded signal containing the appropriate bit value. In step 330, the signals created in step 325 are added to form the encoded string signal containing the bit string. This encoded output signal is then stored in second one of the output signal buffers 297.

Figure 15:
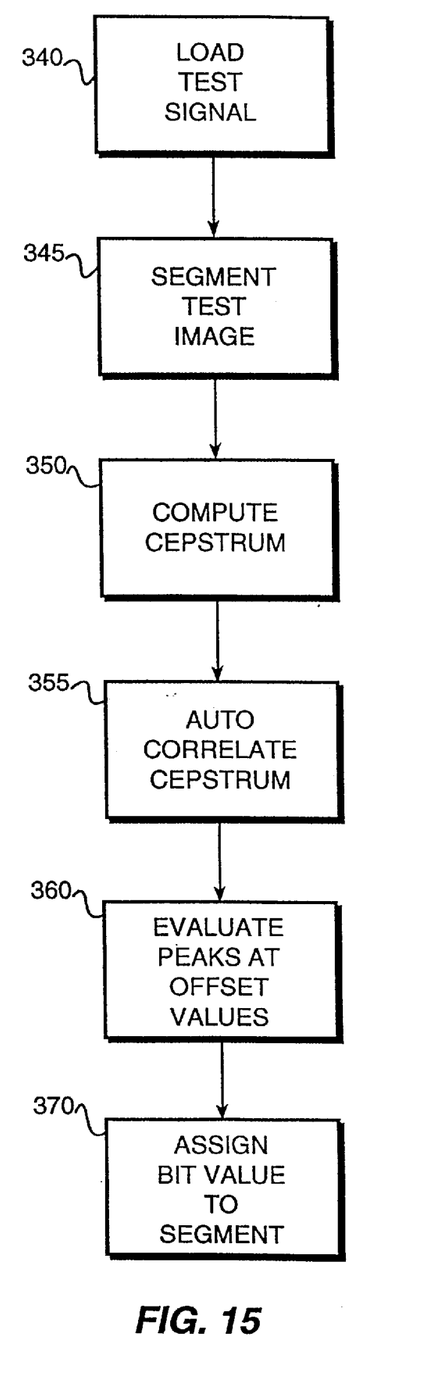
FIG. 15 is a flow chart illustrating decoding according to the invention.

As shown in FIG. 15, for decoding a bit stream in a test signal, in the first step 340, the signal is first loaded into one of the signal buffers 262. In step 345, the module 292 accesses the loaded test signal and performs the segmentation. For each segment, in step 350 the module 292 computes the cepstrum, which is autocorrelated in step 355. In step 360, the module evaluates the magnitude of the autocorrelation at times equal to each of the offset values associated with bit values of one and zero. In step 370, a bit value is assigned to the segment based on the magnitudes evaluated in step 360.

It will therefore be seen that the foregoing represents a highly extensible and advantageous approach to data embedding, especially in audio signals. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations.

What is claimed is:

1. A method of embedding a data value in a host audio signal, the method comprising the steps of:

a. defining an offset value associated with the data value;

b. defining a first echo amplitude associated with the data value; and c. creating an encoded signal comprising the host audio signal and a first repetition of at least a portion of the host audio signal, the repetition having the first echo amplitude, and, in the encoded signal, being separated in time from the host audio signal by the offset value.

2. The method of claim 1 wherein the encoded signal comprises an additional repetition, having an additional echo amplitude, and being separated in time from the first repetition by the offset value.

3. The method of claim 1 wherein the encoded signal comprises a plurality of additional repetitions, each having a respective additional echo amplitude, and being separated in time from the first repetition by an integral multiple of the offset value.

4. The method of claim 3 wherein one of the additional repetitions has an additional echo amplitude equal to the product of the first echo amplitude and a decay rate, each other of the additional repetitions having a respective additional echo amplitude equal to the product of the first echo amplitude and an integral power of the decay rate.

5. The method of claim 4 wherein the decay rate equals the first echo amplitude.

6. The method of claim 4 wherein the first echo amplitude is less than 0.85.

7. The method of claim 4 wherein the first echo amplitude is less than 0.6.

8. The method of claim 4 wherein the first echo amplitude is between 0.4 and 0.8.

9. The method of claim 1 wherein the absolute value of the offset value is less than 1.5 milliseconds.

10. The method of claim 1 wherein the absolute value of the offset value is less than 1 millisecond.

11. The method of claim 1 wherein the absolute value of the offset value is between 0.5 and 1 millisecond.

12. The method of claim 1 wherein the offset value is positive.

13. The method of claim 1 wherein the offset value is negative.

14. The method of claim 1 wherein the encoded signal is for transmission by telephone.

15. The method of claim 1 wherein the encoded signal is for broadcast by radio.

16. The method of claim 1 wherein the encoded signal is part of an audiovisual medium.

17. A method of embedding information in a host audio signal, the method comprising the steps of:

a. defining a plurality of offset values, each offset value being associated with one of a plurality of data values;

b. defining a plurality of echo amplitudes, each amplitude being associated with one of the plurality of data values; and c. creating an encoded string signal containing the host audio signal and echoes of sections of the host audio signal, each echo having one of the echo amplitudes and being separated in time from the host audio signal by one of the offset values, the echoes being ordered so as to encode a series of data values.

18. The method of claim 17 wherein the encoded string signal contains two echoes of the same section of the host audio signal, each of the two echoes being separated in time from the host audio signal in the encoded string signal by an offset value, each said offset value being unequal to the other, each said echo embedding a different data value.

19. The method of claim 18 wherein the encoded string signal contains embedded two series of data values.

20. The method of claim 17 further comprising the step of creating a plurality of encoded signals, each encoded signal having an embedded data value and, comprising a portion of the host audio signal and an echo of the portion of the host audio signal, the echo having one of the echo amplitudes and being separated in time from the host audio signal in the encoded signal by one of the offset values, the echo embedding the data value.

21. The method of claim 20 wherein the portion of the host audio signal in one of the encoded signals is identical to the portion in every other of the encoded signals and further comprising the steps of:

a. identifying a set of temporal points; and b. using the set of temporal points to divide each of the encoded signals into a series of segments, each segment having an origin defined by a temporal point and containing an echo, corresponding to the value embedded in the respective encoded signal, of a section of the host audio signal, the encoded string signal comprising segments from the encoded signals, the segments arranged so that the encoded string signal contains the original host signal and echoes of sections of the host audio signal, the echoes being ordered so as to encode the series of data values.

22. The method of claim 20 wherein the portions of the host audio signal in any two of the encoded signals do not coincide, the encoded string signal being created by concatenating the encoded signals.

23. The method of claim 21 wherein the steps of dividing the first and second encoded signals into segments and of creating an encoded string signal comprise:

a. filtering each of the encoded signals with a respective mixer function having value equal to one at time values corresponding to a region between temporal points defining one or more segments of the respective encoded signal that are to be included in the encoded string signal and value equal to zero at time values corresponding to a region between temporal points defining one or more segments not to be so included, thereby creating a plurality of partial strings; and b. adding the partial strings together.

24. The method of claim 23 wherein the value of each mixer function is between zero and one at time values corresponding to a region of the encoded signal filtered by that mixer function between a region to be included and a region not to be included in the encoded string signal.

25. The method of claim 17 wherein a first of the plurality of offset values is a one offset, associated with a binary one, and the second of a plurality of offset values is a zero offset, associated with a binary zero.

26. The method of claim 25 wherein the one offset and the zero offset differ by at least 0.2 milliseconds.

27. The method of claim 17 wherein the absolute value of each of the plurality of offset values is less than 1.5 millisecond.

28. The method of claim 17 wherein the absolute value of each of the plurality of offset values is less than 1 millisecond.

29. The method of claim 17 wherein the encoded string signal contains more than one echo, separated from one another by one of the plurality of bit values, of the same section of the host audio signal, the more than one echo embedding one bit having a bit value associated with the one of the plurality of bit values.

30. A method of embedding information in a host audio signal, the method comprising the steps of:

a. defining a pulse train comprising a copy pulse, having a copy amplitude, for reproducing the host audio signal, and a first echo pulse, having a first amplitude, for creating a first echo of the host audio signal, the copy pulse and the echo pulse being separated in time by an offset value, the offset value being associated with a data value, the ratio of the first amplitude to the copy amplitude defined to be the echo amplitude; and b. processing the pulse train with the host audio signal, thereby creating an encoded signal, comprising the host audio signal and a first echo of the host audio signal, containing the data value.

31. The method of claim 30 wherein the pulse train farther comprises an additional pulse having a pulse amplitude and being separated in time from the first echo pulse by the offset value.

32. The method of claim 30 wherein the pulse train further comprises a plurality of additional pulses, each having a respective pulse amplitude, and being separated in time from the first echo pulse by an integral multiple of the offset value, each of the plurality of additional pulses creating an additional repetition of the host audio signal in the encoded signal.

33. The method of claim 32 wherein one of the one or more additional pulses has a pulse amplitude equal to the product of the first amplitude and a decay rate, each other of the one or more additional pulses having a respective pulse echo amplitude equal to the product of the echo amplitude and an integral power of the decay rate.

34. The method of claim 32 wherein the pulse train is a discrete-time exponential.

35. The method of claim 30 wherein the first amplitude is less than 0.85.

36. The method of claim 30 wherein the first amplitude is less than 0.6.

37. The method of claim 30 wherein the first amplitude is between 0.4 and 0.8.

38. The method of claim 30 wherein the echo pulse is a discrete impulse.

39. The method of claim 30 wherein the echo pulse is Gaussian in shape.

40. The method of claim 30 wherein the absolute value of the offset value is less than 1 millisecond.

41. The method of claim 30 wherein the absolute value of the offset value is less than 1.5 millisecond.

42. The method of claim 30 wherein the absolute value of the offset value is between 0.5 and 1 millisecond.

43. The method of claim 30 wherein the echo pulse has a form that introduces into the encoded signal a resonance perceived as a typical natural resonance.

44. A method for determining whether a test signal contains a datum embedded by creating an encoded signal comprising a host audio signal and a scaled repetition of the host audio signal, the scaled repetition in the encoded signal being separated in time from the host audio signal by an offset value associated with the value of the datum, the method comprising the steps of:

a. observing the amplitude of a function of the test signal at the offset value; and b. determining whether the test signal contains the datum based on the amplitude of the function at the offset value.

45. The method of claim 44 wherein the step of observing the amplitude includes observing the autocorrelation of the test signal.

46. The method of claim 44 wherein the step of observing the amplitude includes observing the cepstrum of the test signal.

47. The method of claim 44 wherein the step of observing the amplitude includes observing the autocorrelation of the cepstrum of the test signal.

48. A method of decoding a string of data values embedded in an encoded string signal by defining a plurality of offset values, each offset value being associated with one of a plurality of data values, and creating an encoded string signal comprising a host audio signal, divided into encoding temporal segments, each encoding temporal segment corresponding to a position in the string, each segment containing an echo of a respective section of the host audio signal, the echo in each segment being separated in time from the host audio signal by a respective offset value, the respective segment representing the data value associated with the respective offset value, the method of decoding comprising the steps of:

a. dividing the encoded signal into decoding temporal segments corresponding to the encoding temporal segments;

b. in each segment, observing the amplitude of a function of the encoded signal at each of the plurality of offset values; and c. assigning a segment data value to the segment based on the values observed.

49. The method of claim 48 wherein the step of observing the amplitude includes observing the autocorrelation of the test signal.

50. The method of claim 48 wherein the step of observing the amplitude includes observing the cepstrum of the test signal.

51. The method of claim 48 wherein the step of observing the amplitude includes observing the autocorrelation of the cepstrum of the test signal.

52. The method of claim 48 wherein the decoding temporal segments are related to the encoding temporal segments such that exactly one decoding temporal segment corresponds to each encoding segment.

53. The method of claim 48 wherein the decoding temporal segments are related to the encoding temporal segments such that two decoding temporal segments having the same length correspond to each encoding temporal segment.

54. The method of claim 53 wherein every other decoding segment is designated an odd decoding segment and the remaining decoding segments are designated even decoding segments, each segment data value being designated an odd segment data value or an even segment data value according to the decoding segment to which that segment data value is assigned, either the odd segment data values or the even segment data values being determined to be the string embedded in the encoded string signal, based on the presence or absence of an error correction code in the odd or even segment data values.

55. The method of claim 48 wherein the decoding temporal segments are related to the encoding temporal segments such that an odd number of adjacent decoding temporal segments of equal length form a segment set corresponding to an encoding temporal segment.

56. The method of claim 55 further comprising the step of ascribing the segment data value assigned to the majority of decoding segments in a segment set to every segment in that segment set, the entire segment set corresponding to a position in the string embedded in the encoded string signal.

57. The method of claim 48 wherein the same function is observed in each segment.

58. The method of claim 48 wherein the function observed in one of the segments differs from the function observed in another of the segments.

59. The method of claim 53 wherein the encoding temporal segments have an encoding segment length and the decoding temporal segments have a decoding segment length equal to less than half of the encoding segment length.

60. An apparatus for embedding information in a host signal, the apparatus comprising:

a. input means for accepting the host signal;

b. means for associating an offset value with a bit value; and c. means for creating an encoded signal containing the host signal and an echo of the host signal, the echo being separated in time in the encoded signal from the host signal by an offset value associated with a bit value embedded in the encoded signal.

61. An apparatus for determining whether a test signal contains a bit embedded as an echo of a host audio signal, the echo being separated in time from the host audio signal in the test signal by an offset value associated with a value of the bit, the apparatus comprising:

a. input means for accepting the test signal b. means for computing the amplitude of a function of the test signal at the offset value;

c. means for determining whether the test signal contains the bit based on the computed amplitude.

* * * * *